Oct. 12, 1954          H. C. SWERTFEGER                2,691,262
                  DRUM TYPE BRUSH CLEARING MACHINE
Filed Feb. 28, 1951                              4 Sheets-Sheet 1
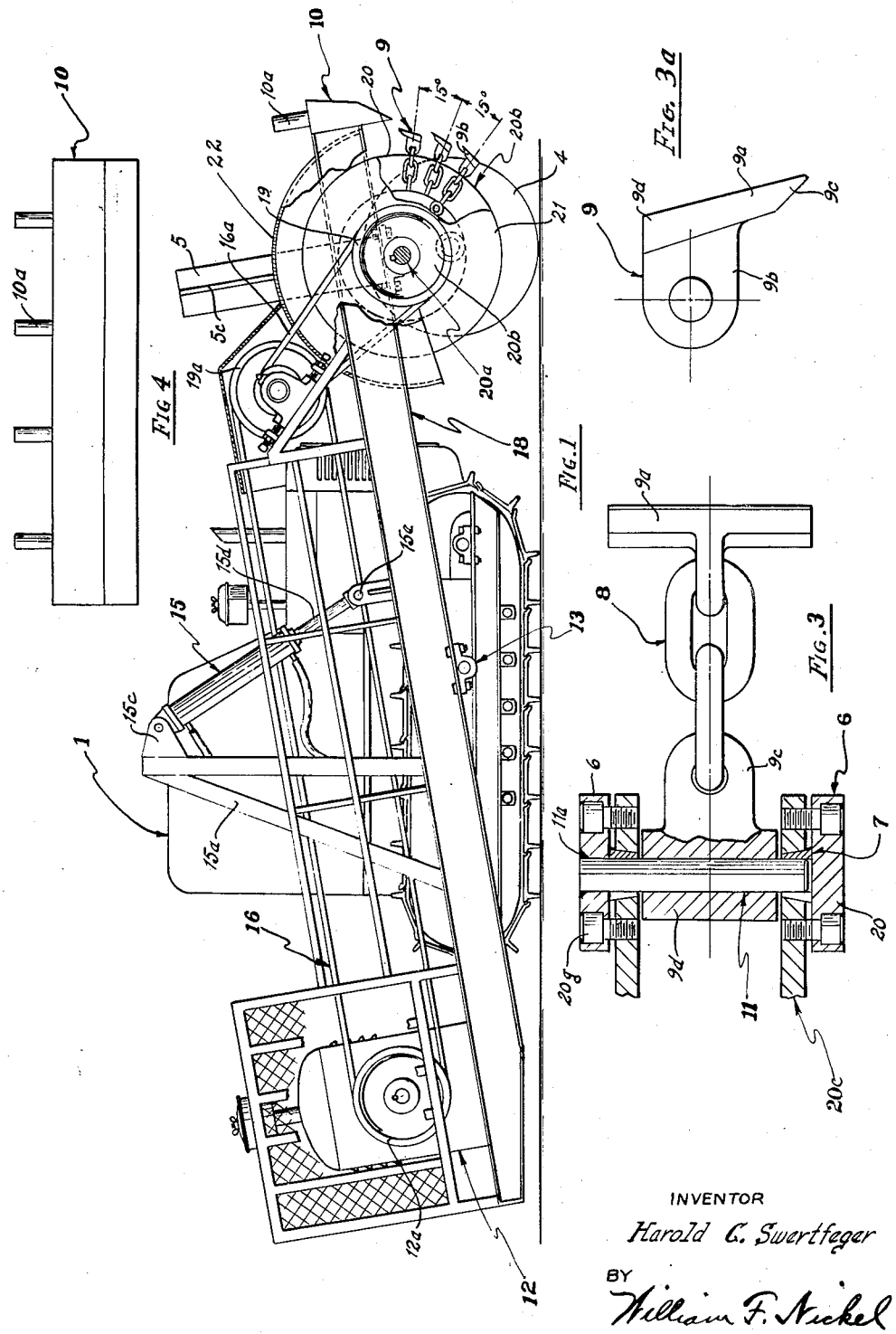
INVENTOR
*Harold C. Swertfeger*
BY
*William F. Nickel*
ATTORNEY Oct. 12, 1954  H. C. SWERTFEGER  2,691,262
DRUM TYPE BRUSH CLEARING MACHINE
Filed Feb. 28, 1951  4 Sheets-Sheet 2
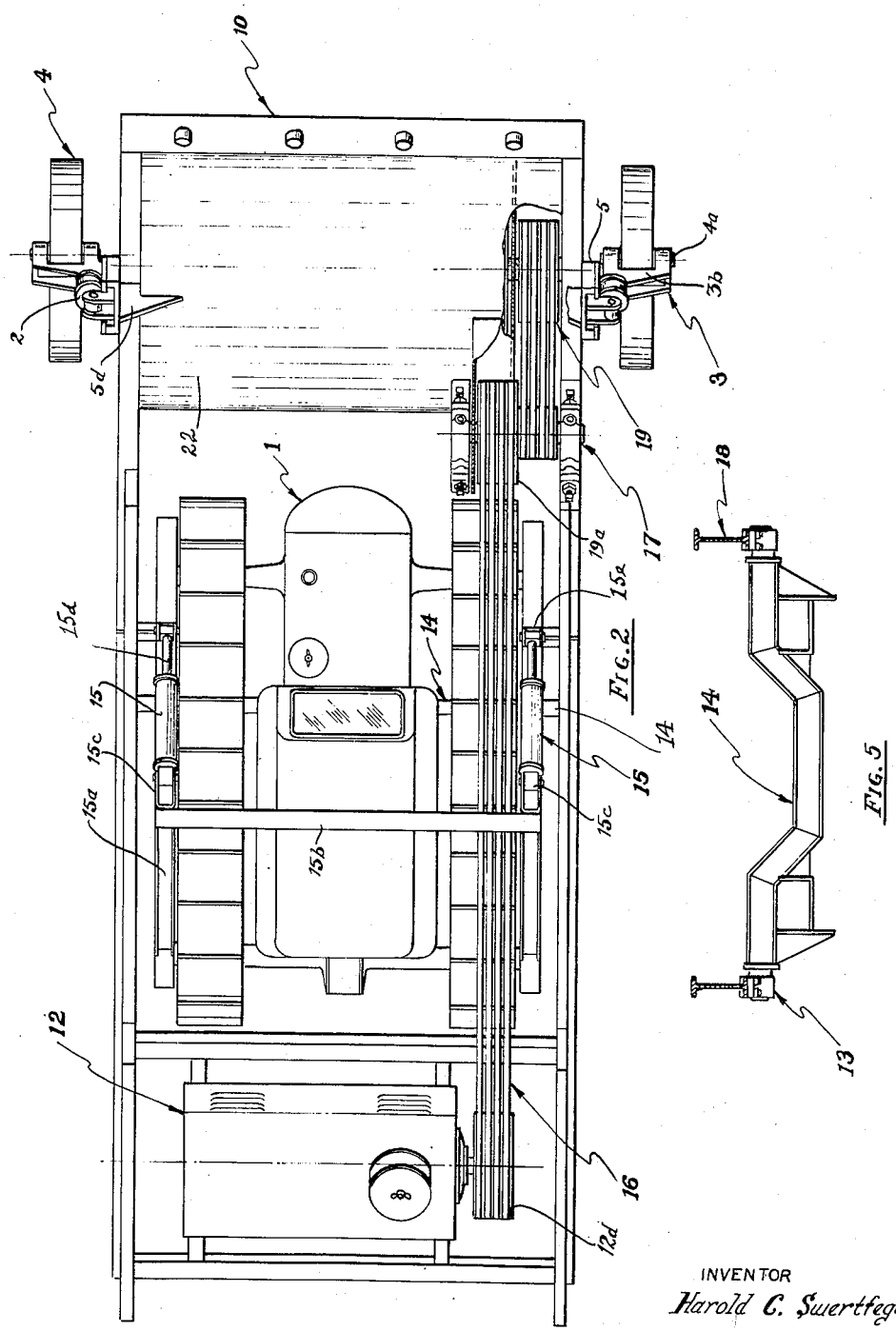
INVENTOR
*Harold C. Swertfeger*
BY
*William F. Aickel*
ATTORNEY

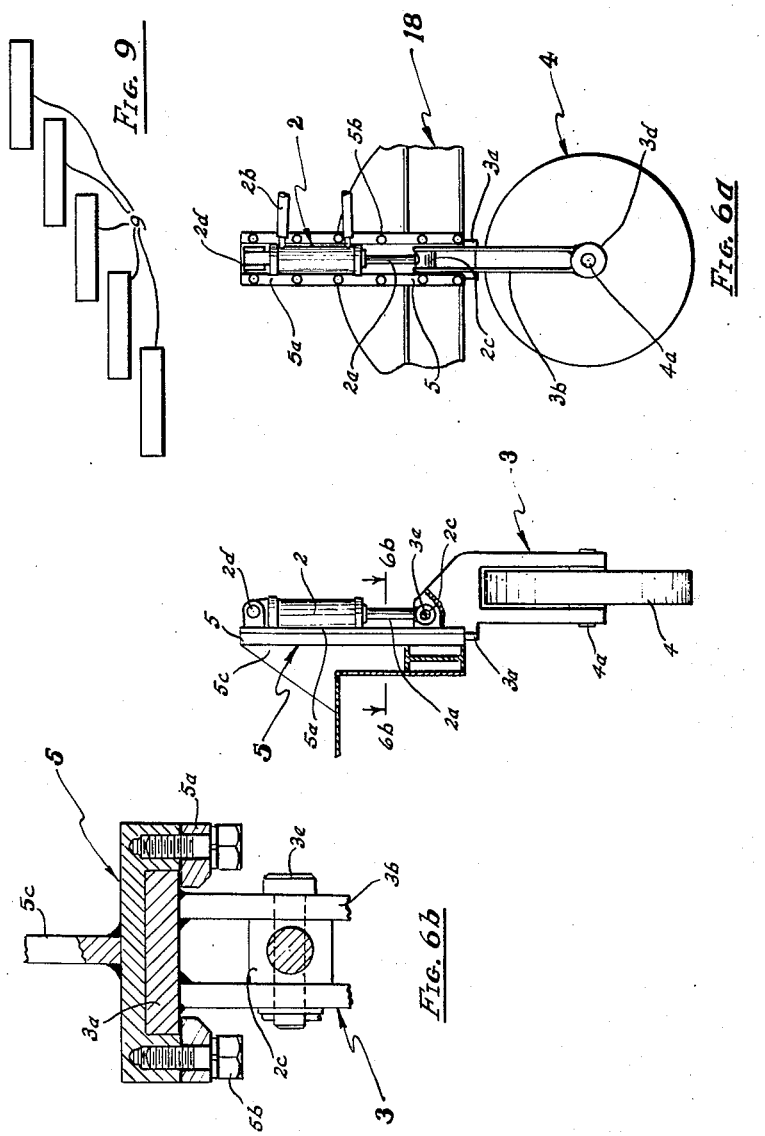

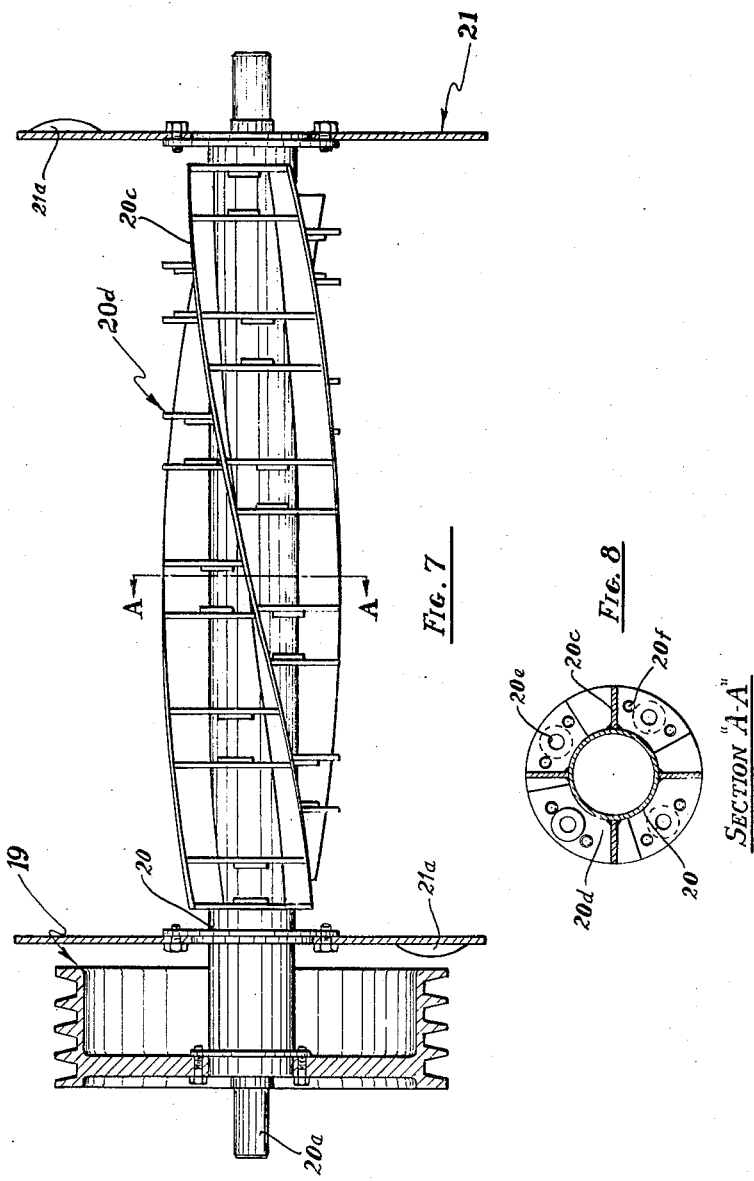

Patented Oct. 12, 1954

2,691,262

UNITED STATES PATENT OFFICE 2,691,262

DRUM TYPE BRUSH CLEARING MACHINE

Harold C. Swertfeger, Jarratt, Va.

Application February 28, 1951, Serial No. 213,159

12 Claims. (Cl. 55—118)

This invention is an improved automotive machine for clearing ground of all overgrowth such as brush, vines, bushes and even trees of moderate size by cutting and breaking up and shredding them where they are rooted in the earth.

An important object of this invention is to provide in one unit means of propulsion and means for removing, cutting and shredding unwanted growth. To this end, the machine comprises a self powered body that carries a tiltable frame bearing at the rear an auxiliary engine connected to drive a rotatable drum, to which is attached a number of flexibly connected beaters or flails; said drum and flails being at the forward end of the frame, which carries a stout cross-bar in front of the drum to engage the growth, and enables the beaters or flails to operate with efficiency and thoroughness.

The nature and advantages of the invention are explained in the following description, and the novel characteristics are pointed out in the appended claims. But the disclosure is illustrative only and variations may be adopted, not shown on the drawings, but fully in accordance with the spirit of the invention and embraced within the scope and meaning of the terms in which the claims are expressed.

On the drawings:

Figure 1 is a side elevation of a machine according to the invention.

Figure 2 is a top view of said machine.

Figure 3 illustrates on an enlarged scale the construction of the flails and mode of connecting them in place.

Figure 3a is a side view of one of the flails or beaters.

Figure 4 shows the cross-bar at the front end of the frame which engages the growth and bends it over as the flails strike it.

Figure 5 illustrates a member which is transversely mounted upon the body and provides a pivotal support to enable the frame to be tilted.

Figure 6 shows in front elevation one of the front wheels of the machine and mode of mounting the same.

Figure 6a is a side view thereof.

Figure 6b is an enlarged section on line 6b—6b in Figure 6.

Figure 7 is an enlarged front view of the drum to which are attached the flails of Figure 3.

Figure 8 is a section on line A—A of Figure 7; and

Figure 9 indicates the relative positions of the flails on the drum, this view being diagrammatic.

The numeral 1 indicates a tractor having a body carrying an engine to propel the machine, and having endless treads at the sides, to which the engine, through suitable gearing, transmits its power for propulsion. The tractor can be of well-known construction, having a framework on which the engine and treads are mounted, and as it is not a part of this invention, it need not be more fully described. The tractor can be propelled and steered or stopped at will by means of the usual controls within the reach of the operator.

At the center of the tractor the body thereof carries a member 14 (Figure 5). This member has the form of a transverse horizontal beam affixed to said frame, and it projects on either side beyond the tractor treads. The rectangular frame 18 extends beyond the ends of the body and is mounted upon suitable journals 13 located at the outer ends of this cross-member 14 to be tilted about said journals as pivots. At the rear end of the frame 18 is mounted an auxiliary engine 12 which generates and transmits power through belts 16 from a pulley 12a on the engine 12 at one end thereof to an intermediate pulley 19a at the front of the frame 18. From this pulley, similar belts run to another pulley 19 that is rigidly connected to the sheave 19 mounted at one end of drum member 20, which is mounted transversely upon the main frame 18 at its front end, ahead of the tractor and just behind the cross-member 10, at the front extremity of the frame 18. The drum is a hard hollow metal cylinder with trunnions 20a at its ends mounted in bearings 20b on the lower side of the frame 18, and the pulley 19 is keyed or otherwise affixed on one of said trunnions. The belts are preferably V-shaped, and are used in multiple, the pulleys all having several grooves for the belts 16 and 16a. The bar 10 has forward faces which slope downward and rearward, as indicated in Figure 4. The flails 9 are extended by centrifugal force as the drum 20 is rotated by the power of the engine 12. A semicircular hood 22 extends across the front end of the main frame 18 to cover the upper half of the circle described by the flails 9, and is made large enough that clearance is provided between the hood and the extended flails. The drum 20, with the attached flails 9 can be rotated in either direction, but better shredding action is accomplished by having the rotation counter-clockwise when viewed from the right side of the machine.

At either side of main frame 18, at a point in line with the drum 20 are vertically shiftable gauge wheels 4 mounted on trunnions 4a in bearings 3d at the lower end of yoke-shaped supports 3, which carry at their upper ends heads 3a that are slidably mounted in channel-shaped guide members 5, rigidly secured to the frame 18. See Figures 6, 6a and 6b. At the vertical edges of the guide members 5 are strips 5a overlapping the side edges of the head 3a, and secured by bolts 5b. Each channel member 5 is braced by a reinforcement 5c welded to it and the frame 18, and is long enough to carry a vertical fluid pressure cylinder 2 attached to its upper portion. Each cylinder 2 has a piston therein with a rod 2a projecting from its lower end. Pipes 2b admit and withdraw a fluid medium from both ends of the cylinder to raise or lower the pistons and rods 2a. Each support 3 has ribs or flanges 3b connecting the bearing 3d to the outer face of the head 3a and welded thereto; and at the upper end of each head 3a, between the ribs 3b, the rod 2a has a transverse bearing 2c, for a headed bolt 3e which passes through the ribs 3b also, and is secured by a cotter pin and washer to connect the piston rod 2a to the support 3. The members 5 are of course high enough for the necessary movement of the supports 3 and front wheels 4. Each cylinder 2 is attached in any suitable manner to one of the members 5, as by matching perforated lugs on said member and the piston, as indicated at 2d.

A fluid operating medium, such as oil under pressure, supplied by a pump, is admitted to the cylinders under the control of a suitable valve, not shown, so that the front end of the main frame 18, carrying the drum 20 and flails or beaters 9, can be raised or lowered by tilting it on the journals 13 as the piston rods in the cylinder move up or down according to the operation of the control valve aforesaid. This permits the operator to change the position of the drum so that the ends of the flails 9 strike the growth well above ground level, at the ground level or even below the surface. By moving the valve to the "hold" position, the selected height of the cut is maintained, by the wheels 4.

In order that the machine be made meaneuverable, and to facilitate turning in a relatively small space without dragging the wheels 4 over the ground, the machine is equipped with another pair of hydraulic cylinders 15. To this end a sturdy vertical frame 15a is secured to the body of the tractor at either side to the rear of the journals 13, and the support 15a are connected and braced at the top by a cross-beam 15b. They are mounted just outside of the endless treads. At the top of each frame 15 and the upper end of cylinder 15 are matched perforated lugs, so that the cylinders 15 can be connected to the frame 18 by means of pins through the lugs, as indicated at 15c. The same hydraulic pump which furnishes oil under pressure for the front wheel cylinders 2, can be used to supply oil for the cylinders 15, each of which contains a piston and a projecting rod 15d. Through a suitable valve, oil is admitted into cylinders 15 through a port at the lower end. When the piston rods 15d which are pinned to the frame 18 at 15e, are retracted, the main frame 18 is lifted at the front as the frame 18 pivots on the journals 13 of the beam 14. Thus the front end of the tiltable main frame 18 is raised high enough to lift the gauge wheels 4 in turning. This action also permits the frame 18 to be raised so that the flails 9 may be easily replaced and other repairs and adjustments to the drum and adjacent parts can be made without difficulty.

The several features above-described produce in combination a complete unit which is self-propelled, and in which all controls that regulate the several motions, are grouped within reach of the operator on the body 1. By mounting the auxiliary engine 12 at the rear end of the main frame 18, approximate balance fore and aft of the pivot point 13 on the cross-beam 14, is achieved. Hence, the full weight is evenly distributed over the treads and good traction and flotation are obtained. The wheels 4, in cooperation with the beam 14 and frame 18, perform in addition to regulation of the height of the cut, the important function of compensating for unevenness of the ground. The setting of the valve which controls cylinders 15, in the "float" position, permits the piston rods 15d to move freely in or out without pressure being exerted upon them, and the wheels 4 can raise or lower the main frame 18 by tilting it on the beam 14 according to the contour of the ground. Thus when the machine comes to a gully or depression which is to be crossed, the wheels 4 permit the front end to sink and maintain the flails 9 at the same selected position relative to the ground. As the tractor reaches the depression and noses down the wheels 4 hold the frame up at the front end, since the frame 18 is free to tilt on the journals 13. When the far side of the depression is reached, the frame 18 is lowered in relation to the tractor which is then climbing the far bank. It is apparent that, but for this construction, the front end of the frame with the drum and flails, might alternately be forced down into the ground or lifted into the air. But with the arrangement described, the drum and flail assembly are automatically maintained in effective operating position.

The structure of the drum is illustrated in Figures 7 and 8. To the cylindrical body 20 are welded several ribs 20c which extend spirally along the length of the drum between the deflector plates or shields 21 that are affixed to the ends of the drum adjacent the trunnions 20. The pulley 19 is between one of the plates 21 and the adjacent trunnion 20a. The curvature of these ribs is such that one end of each rib is secured 90° in advance of the other end. Between the flanges 20c and at right angles to the central axis of the drum, are welded flanges 20d, in pairs, having holes 20e as shown in Figure 8, tapered to match as the tapered split bushing 7 shown in Figure 3. At the sides of the holes 20e are threaded holes 20f to receive cap screws 20g. This disposition of the webs or flanges 20d with openings 20e in pairs, is such that, as the drum is rotated, the centers of the tapered holes 20e which are about 15 angular degrees apart, will progressively meet any given straight line extending across the front of the drum 20. The flails or beaters 7 are secured to the flanges 20d by pins 11 (Figure 3) in the apertures 20e.

Since these tapered holes 20e mark the points of attachment of the flails, the spiral alinement of the flails 9 in each row between the webs 20d along the drum distributes the working load. The impact of the flails in each spiral row is not simultaneous, but successive, one flail striking the growth after another in a series of blows. When the flails of one row pass the arc of operation, the flails of the next row come into play. No two flails in a given row hit at the same instant, so that the striking force and load result in an even distribution over the whole length and circumference of the drum. If the flails were arranged in straight transverse rows along the length of the drum, all flails in a given row would strike simultaneously, with the result that the load would be concentrated and heavier several times in each revolution. Such "peaks" in the load would impose heavy shocks on the engine 12 and all connected parts.

The deflector plates or shields 21 serve to protect the pulley 19 at one end of the drum, and the bearings 20b and adjacent parts at the other from damage by an end flail as it may be momentarily deflected from its normal path of rotation by striking an object such as a stump or rock. A series of holes are located along the periphery of either deflector plate. Counterweights 21a of suitable mass are bolted or welded to the deflector plates 21 at selected points to maintain dyanamic balance of the drum and flail assembly.

Another meritorious feature of the design of the drum 20 and flails 9 is that no two pairs of webs 20d are directly in line longitudinally of the machine; but each pair is laterally offset with respect to corresponding pairs in succeeding spiral rows. See Figure 7. This arrangement leaves no gaps or spaces between the paths of travel described by the heads 9a of the flails 9, for the combined widths of the outer faces of all the flails heads 9a attached to the drum, approximate twice the distance between the deflector plates 21a. In other words, the flails heads 9a overlap one another at the ends, as shown in Figure 9. Hence the flails leave no interval through which standing vegetation might escape destruction.

Each flail 9a has a perforated lug 9b to enable it to be attached by chain links 8 to a similar lug 9c on a sleeve 9d between two paired flanges 20c. The split and slotted bushings 7 inserted into the holes 20e surround the ends of anchor pins 11 in the sleeve 9d, so that as the cap screws 20g in the plates 6 are turned in tightly, each bushing is contracted by the pressure of the plates 6, forcing the bushings 7 deeper into the tapered holes 20e in flanges 20d, with the result that the pins 11 are firmly gripped and held so that they cannot turn in the flanges 20c. The pressure plate 6 at one end of each pin 11 is welded to the pin as at 11a. The cap screws 20g which pass through it and into the webs or flanges 20c thus prevent the pin from turning within the bushings 7. The castings or sleeves 9d are made with holes through their length to receive the pins 11, leaving each sleeve free to oscillate upon its pin. Hence the flails are held securely, and binding of the flanges against the ends of the sleeves 9d is avoided.

The flail heads 9a make an angle other than a right angle with the lugs 9b and the leading edges 9c are chisel-shaped. As the flail heads travel in a circle, the leading edge 9c of each flies lower to the ground than the trailing edge or heel 9d. Thus, the flail heads strike the growth solidly and squarely and the tendancy of the flail heads to deflect or to kick upward is overcome. Since the heel 9d is carried higher in the lowest arc of motion than the leading edge 9c, wear as it occurs, is largely on the outer face of the head 9a back of the edge 9c, and this to some extent gives a self-sharpening effect.

The front of the frame has a hood 22 over the drum, far enough above it to be cleared by the flails as they rotate under it, and the top of the cross-bar 10 can bear upright studs 10a in advance of the forward edge of the hood.

Having described my invention, what I claim as new is:

1. A brush clearing machine comprising a body, means on the body for propelling the machine over the surface of the ground, a frame having front and rear ends, means between said ends for supporting the frame on the body, a power generating unit on the rear end of the frame, a horizontally supported drum on the front end of the frame, operating connections between said unit and said drum, said means being parallel to the drum and mounting the frame, power means connecting the body and the frame so that said frame can be tilted to hold the drum at an adjusted height above ground having an uneven surface, wheels carried by the frame at the ends of the drum and projecting below the drum, yokes having means for rotatably supporting said wheels, each yoke having a head at its upper end, a vertical guide member on the frame for each head, said guide members having vertical retaining strips overlapping the heads, and power cylinders on said members having piston rods attached to said heads for raising and lowering said wheels with respect to said frame to adjust the position of the drum and adjacent part of the frame above said surface.

2. A brush clearing machine comprising a body having an engine for propelling the machine over the ground, a horizontal frame having front and rear ends mounted to tilt on a transverse axis adjacent the center of the frame, said frame having a downward sloping cross-member at the front end to press against brush growth and bend it and thus put the brush in tension, a rotatable drum mounted crosswise on the frame immediately behind the cross-member, a power unit on the rear end of the frame, operating connections between said unit and said drum, a hood on the frame over the drum, wheels at the sides of the frame adjacent the drum and projecting below it, and means for adjusting said wheels with respect to said frame to fix the height of the drum and adjacent part of the frame above said surface, through the said wheels.

3. A brush clearing machine having means for propelling the machine over the surface of the ground, a horizontal tiltable frame having front and rear ends on said machine, means for tiltably mounting the frame between said ends on the machine, a horizontally supported rotatable drum on the front end of the frame, a power generating unit on the rear end of the frame, operating connections between said unit and said drum, wheels carried by the frame at the ends of the drum and projecting below the drum, yokes having means for rotatably supporting said wheels, each yoke having a head at its upper end, a vertical guide member on the frame for each head, said guide members having vertical retaining strips overlapping the heads, and power cylinders on the frame having piston rods attached to said heads for raising and lowering said wheels with respect to said frame to adjust the height of the drum and adjacent part of the frame above said surface.

4. A brush clearing machine having a body, means for propelling the body over the ground, a frame having front and rear ends, means for movably supporting the frame between said ends on the body, a rotatable drum carried by the front end of said frame, a power generating unit on the rear end of the frame, operating connections between said unit and said drum, said means being substantially parallel to said end and mounting the frame to enable it to be tilted about said means and hold said end and said drum at a constant height above ground that is uneven, upright supports at each side of the frame, power cylinders on said supports having piston rods connected to the frame to tilt it and raise or lower the drum and said front end, said frame having wheels at said front end and means for raising and lowering said wheels to adjust the height of said end and said drum above said surface.

5. A brush clearing machine comprising a truck having a body, carrying propelling means and a horizontal longitudinal frame having front and rear ends on the body extending beyond the ends of the body, and means for supporting the frame on the body to tilt on a transverse axis between the said ends, said frame having a cross-bar at its front end to engage and press against brush and bend it over, a drum rotatably mounted crosswise on the frame immediately behind the bar, a power generating unit at the rear end, operating connections between said unit and said drum, a hood on the frame over the drum, wheels at the sides of the frame adjacent the drum and projecting below it, and means for adjusting the wheels to vary the height of the frame at the front and the drum above said wheels.

6. A brush clearing machine comprising a truck having a body, a horizontal frame on the body extending beyond the ends thereof and mounted to tilt on a transverse axis between the said ends, said frame having a crossbar at its front end to engage and press against brush and bend it over, a drum rotatably mounted crosswise on the frame immediately behind the bar, a power generating unit at the rear end, operating connections between said unit and said drum, a hood on the frame over the drum, wheels at the sides of the frame adjacent the drum and projecting below it, means for adjusting the wheels to vary the height of the frame at the front and the drum above said wheels and power generating means connected to propel the machine, said adjusting means comprising vertical cylinders affixed to the sides of the frame, movably mounted plungers in the cyilnders and having rods projecting from the lower ends thereof, and supports for rotatably mounting said wheels connected to said rods.

7. The brush clearing machine comprising a truck having a body, and a horizontal frame having front and rear ends on the body extending beyond the ends of the body and mounted to tilt on a transverse axis between the said front and rear ends, said frame having a cross-bar at its front end to engage and press against brush and bend it over, a drum rotatably mounted crosswise on the frame immediately behind the bar, a hood on the frame over the drum, wheels at the sides of the frame adjacent the drum and projecting below it, means for adjusting the wheels to vary the height of the frame at the front and the drum above said wheels, and power generating means connected to propel the machine and to revolve the drum, said power means comprising an engine mounted at the rear end of the frame, connections extending along the frame to rotate the drum and a separate engine on the body between the frame and first-named engine to propel the machine, the engine at the rear counteracting the weight of the drum.

8. A brush clearing machine comprising a truck having a body, and a horizontal frame having front and rear ends on the body extending beyond the ends of the body and mounted to tilt on a transverse axis between the said front and rear ends, said frame having a cross-bar at its front end to engage and press against brush and bend it over, a drum rotatably mounted crosswise on the frame immediately behind the bar, a hood on the frame over the drum, wheels at the sides of the frame adjacent the drum and projecting below it, means for adjusting the wheels to vary the height of the frame at the front and the drum above said wheels, and power generating means connected to propel the machine and to revolve the drum, said power means comprising an engine mounted at the rear end of the frame, connections extending along the frame to rotate the drum and a separate engine on the body between the frame and the first-named engine to propel the machine, the engine at the rear counteracting the weight of the drum, said adjusting means having the form of power cylinders at the sides of the frame in front, with plungers and downward projecting plunger rods, and means for rotatably supporting said wheels connected to the lower ends of said rods.

9. A brush clearing machine comprising a truck having a body, and a longitudinal frame on the body extending beyond the ends thereof and mounted to tilt on a transverse axis between the said ends, said frame having a cross-bar at its front end to engage and press against the brush and bend it over, a drum rotatably mounted crosswise on the frame immediately behind the bar, beaters having heads linked to said drum along the length thereof and around the circumference, a hood on the frame over the drum, wheels at the sides of the frame adjacent to the drum, means for adjusting the height of the frame at the front above said wheels and power generating means connected to propel the machine and to revolve the drum so that the beaters move counter-clockwise to strike the brush in a forward and upward direction.

10. A brush clearing machine comprising a truck having a body, and a longitudinal frame on the body extending beyond the ends thereof and mounted to tilt on a transverse axis between the said ends, said frame having a crossbar at its front end to engage and press against the brush and bend it over, a drum rotatably mounted crosswise on the frame immediately behind the bar, beaters having heads linked to said drum along the length thereof and around the circumference, a hood on the frame over the drum, wheels at the sides of the frame adjacent to the drum, means for adjusting the height of the frame at the front above said wheels and power generating means connected to propel the machine and to revolve the drum so that the beaters move counter-clockwise to strike the brush in a forward and upward direction, said adjusting means comprising vertical cylinders affixed to the sides of the frame, and movably mounted plungers in the cylinders and having rods projecting from the lower ends thereof, said wheels being mounted on said rods.

11. The brush clearing machine comprising a truck having a body, and a longitudinal frame on the body extending beyond the ends thereof and mounted to tilt on a transverse axis between the said ends, said frame having a crossbar at its front end to engage and press against the brush and bend it over, a drum rotatably mounted crosswise on the frame immediately behind the bar, beaters having heads linked to said drum along the length thereof and around the circumference, a hood on the frame over the drum out of the reach of said beaters, wheels at the sides of the frame adjacent to the drum, means for adjusting the height of the frame at the front above said wheels and power generating means connected to propel the machine and to revolve the drum so that the beaters move counter-clockwise to strike the brush in a forward and upward direction, said power means comprising an engine mounted at the rear end of the frame, connections extending along the frame to rotate the drum and a separate engine on the body between the frame and the drum to propel the machine, the engine at the rear counteracting the weight of the drum.

12. The brush clearing machine comprising a truck having a body, and a longitudinal frame on the body extending beyond the ends thereof and mounted to tilt on a transverse axis between the said ends, said frame having a crossbar at its front end to engage and press against the brush and bend it over, a drum rotatably mounted crosswise on the frame immediately behind the bar, beaters having heads linked to said drum along the length thereof and around the circumference, a hood on the frame over the drum, wheels at the sides of the frame adjacent to the drum, means for adjusting the height of the frame at the front above said wheels and power generating means connected to propel the machine and to revolve the drum so that the beaters move counter-clockwise to strike the brush in a forward and upward direction, said power means comprising an engine mounted at the rear end of the frame, connections extending along the frame to rotate the drum and a separate engine on the body between the frame and the drum to propel the machine, the engine at the rear counteracting the weight of the drum, said adjusting means having the form of power cylinders at the sides of the frame in front, with plungers and downward projecting plunger rods supporting said wheels at the lower ends of said rods.

References Cited in the file of this patent

UNITED STATES PATENTS

| Number | Name | Date |
|---|---|---|
| 1,321,979 | Cassel | Nov. 18, 1919 |
| 2,287,290 | Brown | June 23, 1942 |
| 2,341,486 | Swertfeger | Feb. 8, 1944 |
| 2,452,110 | Dourte | Oct. 26, 1948 |
| 2,486,409 | Holmes | Nov. 1, 1949 |
| 2,491,739 | La Dow | Dec. 20, 1949 |
| 2,527,974 | Tostenrud et al. | Oct. 31, 1950 |
| 2,531,732 | Hoffman | Nov. 28, 1950 |